United States Patent [19]

Beyne et al.

[11] Patent Number: 5,731,584
[45] Date of Patent: Mar. 24, 1998

[54] POSITION SENSITIVE PARTICLE SENSOR AND MANUFACTURING METHOD THEREFOR

[75] Inventors: Eric Beyne, Heverlee; Jordi Nelissen, Overijise, both of Belgium; Ronaldo Bellazzini, Pisa, Italy

[73] Assignee: IMEC vzw, Leuven, Belgium

[21] Appl. No.: 682,835

[22] Filed: Jul. 12, 1996

Related U.S. Application Data

[60] Provisional application No. 60/001,489, Jul. 14, 1995.
[51] Int. Cl.$^6$ .............................. G01T 1/185; H01J 47/02
[52] U.S. Cl. ............................. 250/374; 250/385.1
[58] Field of Search ......................... 250/374, 385.1

[56] References Cited

U.S. PATENT DOCUMENTS

| | | |
|---|---|---|
| 5,308,987 | 5/1994 | Wuest et al. |
| 5,349,194 | 9/1994 | Wuest et al. ............ 250/374 X |
| 5,602,397 | 2/1997 | Pitts et al. ............ 250/385.1 X |
| 5,614,722 | 3/1997 | Solberg et al. ............ 250/374 |

OTHER PUBLICATIONS

"The Micro-Gap Chamber," Bellazzini, et al., *Nuclear Instruments & Methods in Physics Research*, Section A, pp. 69-77, 1993.

*Primary Examiner*—Edward J. Glick
*Attorney, Agent, or Firm*—Knobbe, Martens, Olson & Bear, LLP

[57] ABSTRACT

A microgap sensor, and manufacturing method therefor, which includes a cathode and at least one strip anode parallel to the cathode, in which the strip anode is separated and insulated from the cathode by an insulation layer made from a polymeric material. The microgap sensor further includes a cathodic drift electrode substantially parallel to the cathode, the cathode and drift electrode being separated by a gap fillable with an ionizable gas. The gap is considerably greater than the thickness of the insulating layer, and the strip anode is located in the gap between the cathode and the drift electrode.

36 Claims, 4 Drawing Sheets

POSITION SENSITIVE PARTICLE SENSOR AND MANUFACTURING METHOD THEREFOR

RELATED APPLICATIONS

This application claims priority from United States provisional patent application number 60/001,489, filed Jul. 14, 1995.

BACKGROUND OF THE INVENTION

1. Field of the Invention

The present invention relates to radiation/particle sensors and, in particular position sensitive proportional gas counters, scintillation counters, radiation detectors, polarimeters, cameras and imagers, in particular X-ray detectors, X-ray polarimeters, X-ray cameras and X-ray imagers. The words sensor and detector are considered synonymous in accordance with the present invention.

2. Description of the Related Technology

There is a requirement for particle detectors for detecting particles and, in particular those produced in particle accelerator/collision experiments as well as nuclear radiation particles such as α-particles which occur naturally. Further, there is a requirement to detect various types of radiation with a detector which can detect not only the arrival of radiation but also the arrival position on the detector, e.g., a position sensitive detector for X-rays having gray-tones equal to, or better than conventional X-ray films so that 2-D X-ray images may be transmitted (e.g. via the Internet), displayed, and stored electronically.

U.S. Pat. No. 5,308,987, incorporated herein by reference, describes an X-ray detector which provides for the conversion of X-ray photons into photoelectrons and subsequent amplification of these photoelectrons through the generation of electron avalanches in a thin gas-filled region subject to a high potential. The detector comprises a cathode and an anode separated by a thin, gas-filled region. The cathode may comprise a substrate, such as beryllium, coated with a layer of high atomic number material, such as gold while the anode can be a single conducting plane of material, such as gold, or a plane of resistive material, such as chromium/silicon monoxide, or multiple areas of conductive or resistive material, mounted on a substrate composed of glass, plastic or ceramic. The charge collected by the anode from each electron avalanche is passed through processing electronics to a suitable display unit.

A microsensor may be defined as a sensing device with a sensing element having its critical physical dimension in the sub-millimeter range, e.g. typically ≦100 μm (see "Microsensors, Principles and Applications", Julian Gardner, John Wiley and Sons, 1994). A wide variety of active and passive materials are used to make microsensors. For example, passive materials such as Silicon, Gallium Arsenide, Silicon Dioxide, and Silicon Nitride, and metals such as Aluminum, Gold, Chromium, Titanium and Tungsten may be used. Also active materials such as Platinum, Cadmium Sulfide, Lead Sulfate, Silicon, Germanium, Gallium Arsenide, Quartz, Lithium Niobium Trioxide, Iron and iron alloys, Tin Oxide, Lead and Poly (pyrrole) may be used. Many of the processes developed for electronic silicon microfabrication have been adopted for sensor applications. Engineering a microsensor (sometimes called microengineering) requires appropriate microelectronic fabrication processes, developed from an understanding of micromachining, microfabrication, micromechanics and microelectronics. Standard silicon processing has been adapted to make new types of microsensors.

A microengineered sensor is known from the article "The Micro-gap Chamber", by F. Angellini et alia, Nuclear Instruments & Methods in Physics and Research, Sect. A (1993), pages 69–77, and is shown schematically in FIGS. 1A to 1C. The thicknesses of the layers has been exaggerated for clarity. The sensor includes a 500 μm thick substrate 1 of quartz, but any substrate compatible with microelectronic silicon processing may be used. A first aluminum film 2 about 1 μm thick is deposited onto the substrate 1 and forms the cathode. The cathode is patterned into a number of relatively wide parallel strips 3 which provide a coarse measurement in a direction perpendicular to the subsequently applied anode microstrips 7. A 2 μm thick intermetal oxide (e.g. silicon dioxide) layer 4 is deposited by plasma enhanced chemical vapor deposition and patterned to form a number of parallel microstrips 5 perpendicular to the cathode strips 3. Silicon Oxide is attractive because it requires few processing steps, and as usually applied, has compressive stress which tends to neutralize the tensile stress in metals to keep a thin substrate flat. Furthermore, silicon oxide is rugged, wire bondable and very reliable under thermal shock. A second 2 μm thick aluminum film 6 is applied to the oxide microstrips and patterned with a plasma etching technique so that aluminum (anode) microstrips 7 are formed which lie on and run parallel to the oxide microstrips 5. The width of the anode microstrips 7 is made 8 μm smaller (4 μm on each side) than the oxide microstrips 5. It is considered that this difference in width between the anode and oxide microstrips 5,7 may be reduced to as low as 2 μm. A gas gap 8 of 3 mm is provided bounded on the one side by the anode/cathode array 1, 3, 5, 7 and on the other by a drift electrode 9.

A disadvantage of prior art microengineered sensors is that they place restrictions on the manufacturing methods, on the materials which may be used and on the size of the devices. It is desirable to provide a new radiation/particle sensor and method of manufacturing which is easier and cheaper to manufacture while increasing its performance, in particular the amplification factor.

SUMMARY OF THE INVENTION

The present invention addresses the above needs by providing, in one aspect, a microgap sensor which includes: a cathode, at least one strip anode parallel to the cathode. The strip anode is separated and insulated from the cathode by an insulation layer. The microgap sensor further includes a cathodic drift electrode which is substantially parallel to the cathode, and the cathode and drift electrode are separated by a gap fillable with an ionizable gas. The gap is considerably greater than the thickness of the insulating layer. The strip anode is located in the gap between the cathode and the drift electrode, and the insulation layer is made from a polymeric material.

An advantage of using a polymeric material or an insulating material is that the polymeric material can easily be deposited with a larger thickness than silicon oxide, which leads to a larger amplification factor. Another advantage of using a polymeric material is that the production costs of the microgap sensor can be reduced. Yet another advantage of using a polymeric material as an insulating material is the possibility of making large surface microgap sensors based on multilayer thin film technology used for the production of multichip modules.

Another aspect of the present invention is an improved method of manufacturing a microgap sensor. This method includes the steps of: forming a first conductive cathode layer, depositing a polymeric insulating layer onto the first conductive cathode layer, depositing a second conductive layer onto the polymeric insulating layer, carrying out a first etch on the second conductive layer to form a plurality of anode strip electrodes, removing the polymeric insulating layer except underneath the plurality of anode strip electrodes, and mounting a cathodic drift electrode substantially parallel to said first conductive cathode layer. The first conductive cathode layer and the cathodic drift electrode is separated by a gap which is considerably greater than the thickness of the insulating layer and the plurality of anode strip electrodes lie between the first conductive cathode layer and the cathodic drift electrode.

This method of manufacture is suitable for production of large size sensors, and does not require the deposition or etching of silicon oxides nor ion implantation. In addition, the method of the present invention advantageously provides microgap sensors of larger size and higher gain.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE ILLUSTRATIVE EMBODIMENTS

Illustrative embodiments of the present invention will be described with reference to FIGS. 2 to 4.

Figure 1A:
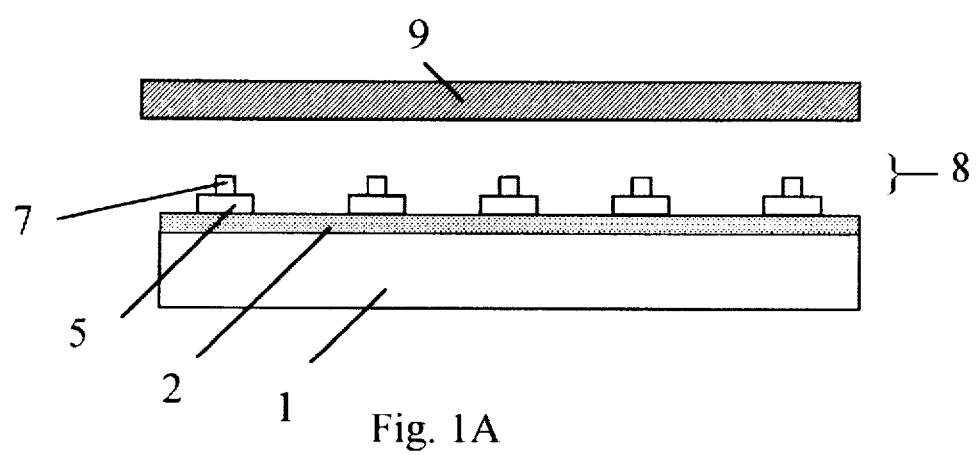
FIGS. 1A and 1B are schematic cross-sections through, and FIG. 1C is a schematic top view of the electrode arrangement of a conventional microgap sensor.
Figure 1B:
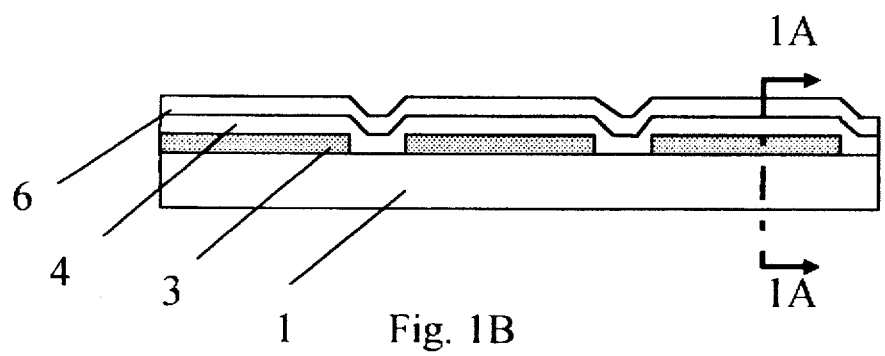
Figure 1C:
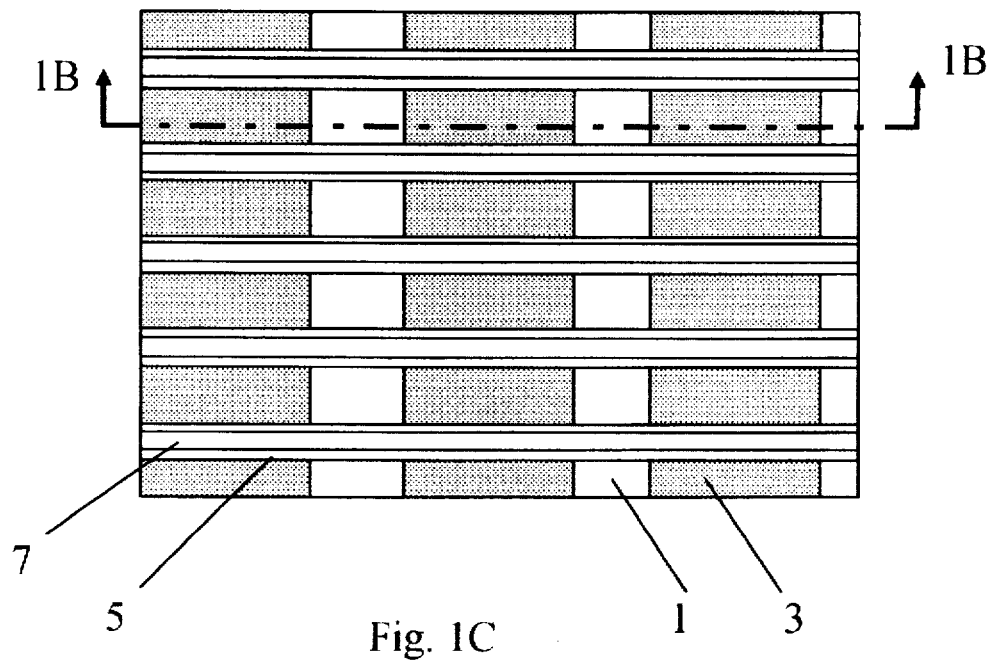
Figure 2A:
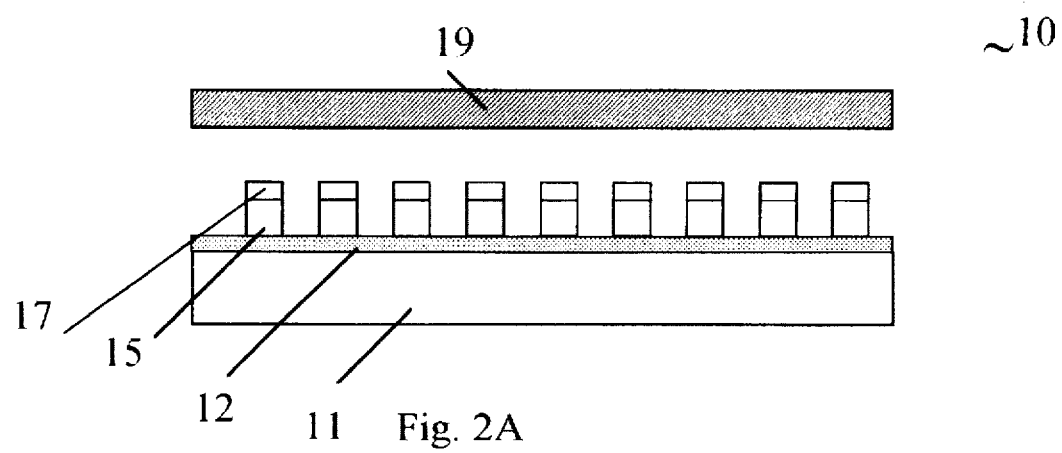
FIG. 2A is a schematic cross-section through, and FIG. 2B is a schematic top view of the electrode arrangement of a microgap sensor in accordance with the present invention.
Figure 2B:
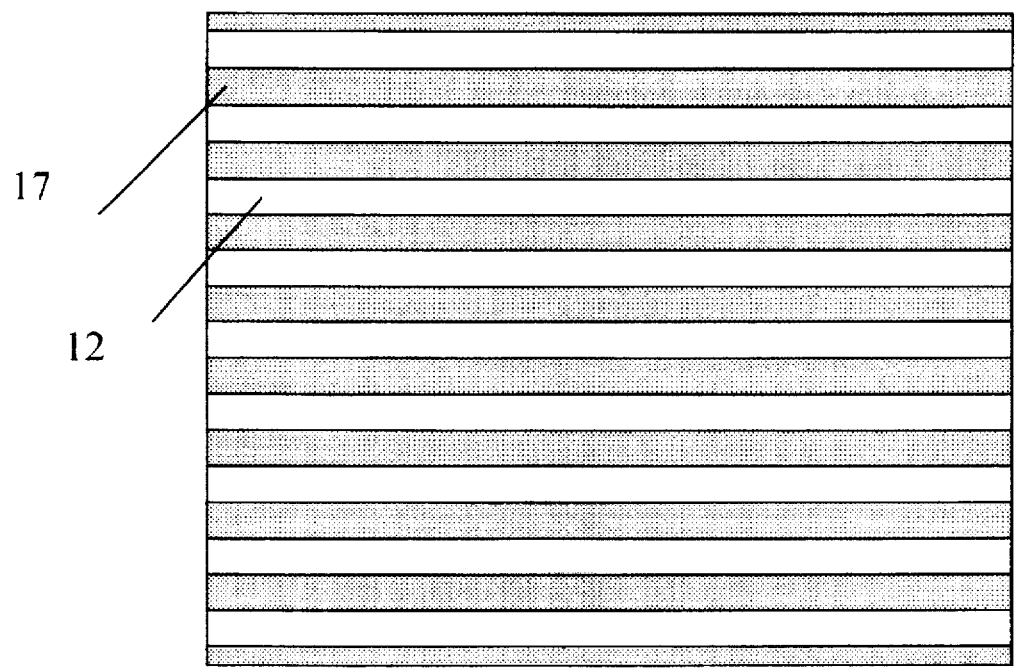

FIGS. 2A and 2B are schematic diagrams of a sensor 10 in accordance with a first embodiment of the present invention. FIG. 2A shows a cross-section through the sensor 10 and FIG. 2B shows a top view of the electrode arrangement. Basically, the sensor 10 consists of a planar cathode 12 on a substrate 11 and a plurality of anodes in the form of narrow strips 17 separated and insulated from the cathode 12 by means of polymeric insulation layers 15. A polymer is a substance the molecules of which are multiples of low-molecular weight units. High temperature stable polymers are preferred. The anode strips 17 are substantially co-extensive with the insulation layers 15 over the active region of the sensor. A drift electrode 19 is placed substantially parallel to the cathode 12 and at a distance 18 of a few mm from the anode strips 17. The gap 18 is filled with an ionizing gas. Conventional electronic signal processing equipment (not shown) may be connected to the cathode 12 and/or the anode strips 17.

Figure 3A:
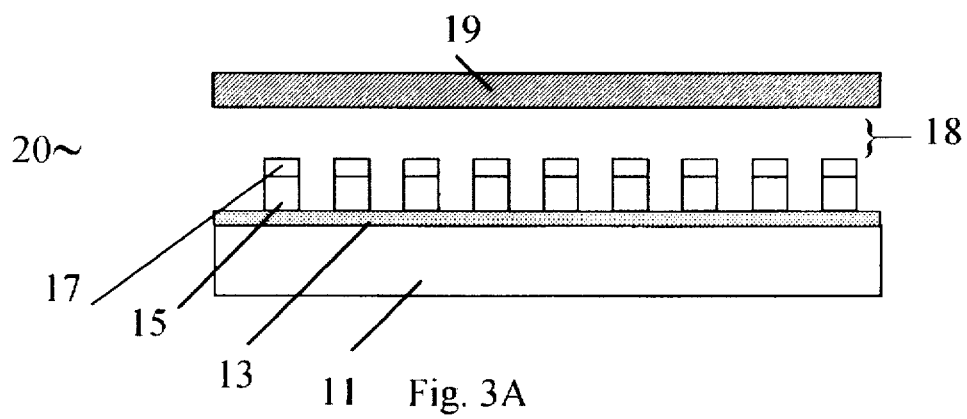
FIGS. 3A and 3B are schematic cross-sections through, and FIG. 3C is a schematic top view of the electrode arrangement of a microgap sensor in accordance with the present invention.
Figure 3B:
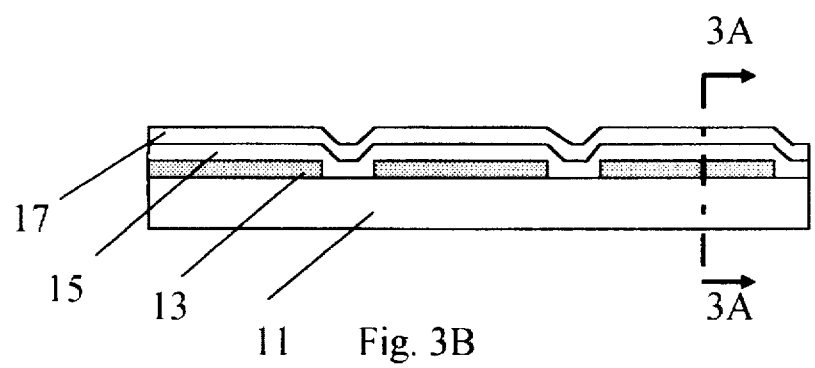
Figure 3C:
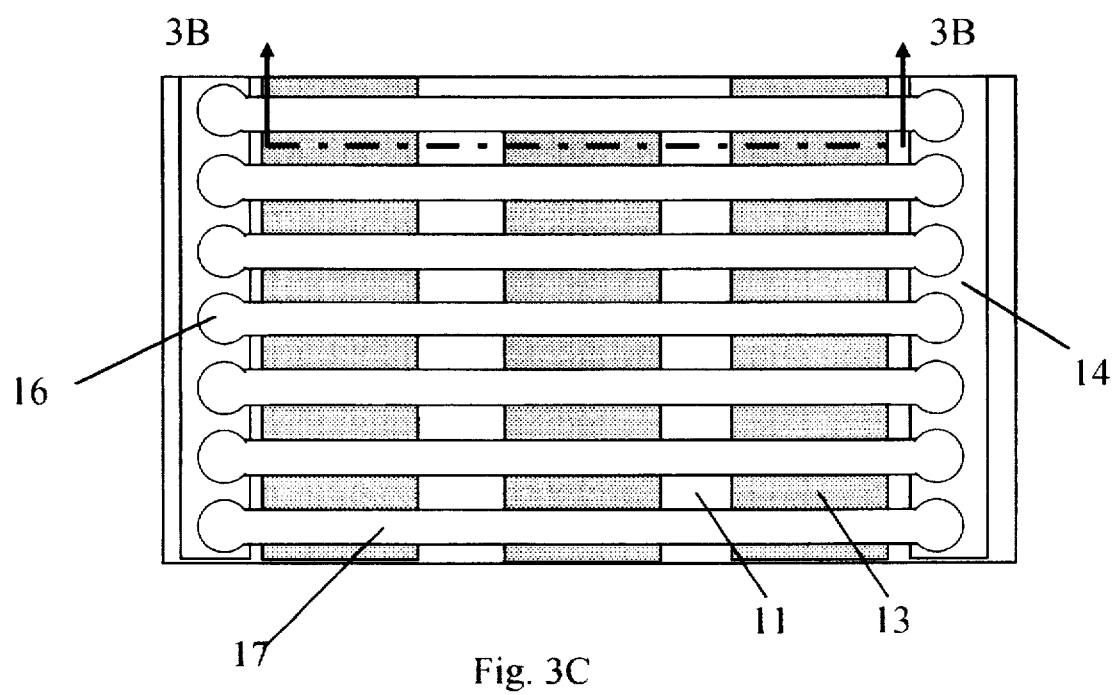
Figure 4A:
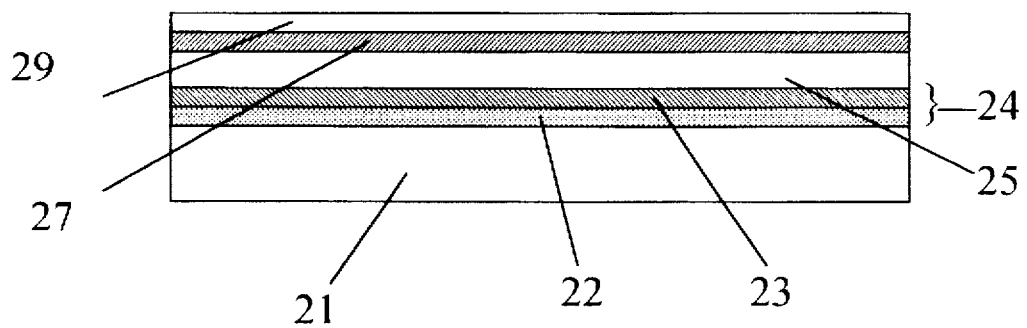
FIGS. 4A to 4C are schematic cross-sections detailing the manufacturing steps of a microgap sensor in accordance with the present invention.
Figure 4B:
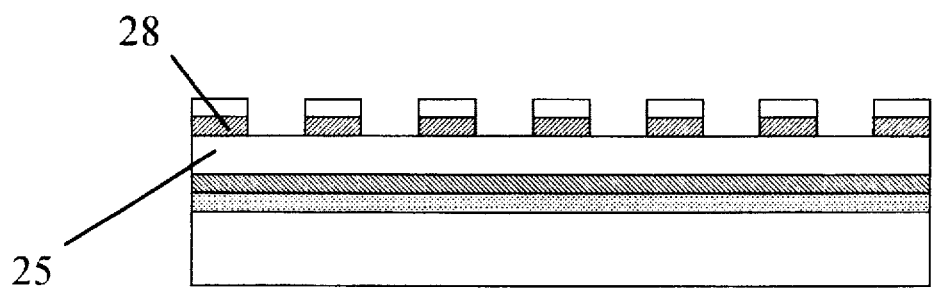
Figure 4C:
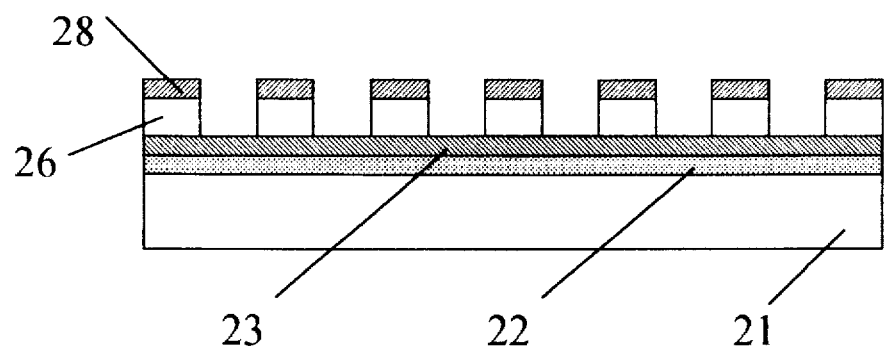

FIGS. 3A to C show schematically a sensor device 20 in accordance with a second embodiment of the present invention. The same reference numbers in FIGS. 3A to C and FIGS. 2A and B refer to the same components of the sensors 10, 20 made from the same materials. FIG. 3A shows a cross-section of the sensor 20. FIG. 3B and 3C show a cross-section through and a top view of the electrode arrangement, respectively. In accordance with the second embodiment, cathode 12 may be separated into a plurality of cathode strips 13, each cathode strip 13 being electrically insulated from its neighbors, thus forming a 2-D array of sensor elements which can be scanned and processed by electronics (not shown) as described, for instance, in "Intelligent sensor systems", Institute of Physics Publishing, 1994. By processing the signals from the anodes 17 and the cathode strips 13, the position of entry of a particle into sensor 10 may be determined as the electrons generated by ionization will tend to move towards the closest region to the entry point of an anode strip 17, hence producing a localized output from the anodes and cathodes 13,17.

Suitable materials for substrate 11 preferably have some rigidity and insulating properties, and are preferably nuclear radiation resistant if the sensor is to be used in High Energy particle detection. Substrate 11 may be made of a flat piece of window glass, quartz, fiber-glass, sapphire, silicon, ceramic, Aluminum Oxide, Aluminum Nitride etc. As mechanical support material for substrate 11, glass of a few hundred microns thick may be used, e.g. 200 μm thick, type DESAG 263 from Schott, Mainz, Germany. One major surface of substrate 11 may be flattened using conventional grinding and polishing techniques. The major surface of substrate 11 may optionally be planarized (not shown) by depositing an insulating layer such as Benzocyclobutene (BCB), Polyphenylquinoxaline, or fluoropolymers such as PTFE, or a Polyimide such as fluorinated Polyimide, Silicone Polyimide, Acetylene terminated Polyimide, Polyimide Iso-Indoloquinazdinedione or similar material.

It is desirable that the insulation layer is planarized to greater than 20% and in a preferred embodiment, planarization is greater than 90%. Planarization is measured by first forming a step feature on a substrate and then covering this feature with the test material. The planarization in % is given by the % difference between the feature height in the test material and in the substrate divided by the feature height in the substrate. Benzocyclobutene and Acetylene terminated Polyimide both provide planarization in excess of 90%. Benzocyclobutene available for example from Dow Chemical under the trade name Cyclotene™ is particularly preferred as it can be spin or spray coated, has excellent insulation and planarization properties and is adequately radiation resistant.

A planar cathode 12 may be formed on the major surface of the glass substrate 11. The cathode 12 may be formed by the deposition of a conductive material for example Al, e.g. by sputtering, or by any other suitable technique. The planar cathode 12 may be patterned to form cathode strip electrodes 13 allowing two dimensional read-out from the sensor 10. Cathode strips 13 may be divided further into cathode regions (not shown) insulated from each other. Cathode 12 or cathode strips 13 are placed under a negative potential of a few hundred Volts, e.g. between −100 and −800, and typically between −300 to −500 Volts. Where the substrate 11 forms the window for entrance of electromagnetic radiation into sensor 10, the cathode 12 or cathode strips 13 may be made from a photocathode material having the property that it emits electrons when photons are incident upon it. Cathode 12 or cathode strips 13 suitable for receiving X-ray or y-radiation may be made of a thin layer of low atomic number such as Beryllium having a thickness of 0.5 to 2 mm, and coated with a layer of high atomic number such as Gold having a thickness of 10 to 50 nm. Photocathodes sensitive to ultra-violet, visible and infrared light may be coated with such materials as Yttrium, Cesium, Cesium Iodide, Sodium or combinations thereof, or combinations of other rare earth elements. Cathode 12 or cathode strips 13 also include Chromium, Tungsten, or Tantalum and may be protected by a layer of Boron, Boron Carbide or Carbon to prevent damage to the cathode.

Anode strips 17 are insulated from the cathode 12, 13 by means of an insulation layer 15. For high energy physics applications, e.g. as a scintillation detector, it is preferable if the insulation material can withstand 100 MRad over 10 years without functional failure. Insulation material for insulation layers 15 preferably has a breakdown strength greater than 100 V/micron (as tested for instance in accordance with ASTM D 149) and a dielectric constant less than 5 (as tested for instance in accordance with DIN 53 483 at 50 Hz and 1 Mhz or ASTM D 150 at 50 Hz or 1 GHz). Further advantageous properties are low water uptake, low dielectric constant, good thermal stability, high glass transition temperature, good adhesion to metals and a high breakdown strength. In accordance with the present invention, the insulation layer 15 is preferably a polymer, preferably a polymer with high temperature stability. In particular layer 15 may be Benzocyclobutene (BCB), Polyphenylquinoxaline, a fluoropolymer such as PTFE, or a Polyimide such as fluorinated Polyimide, Silicone Polyimide, Acetylene terminated Polyimide, Polyimide Iso-Indoloquinazdinedione, or similar insulating polymers. It is advantageous if the insulation layer 15 is uniform in thickness. This reduces the possibility of unexpected early breakdown at a thin section of insulation. Further, as the gain of the sensor 10 is dependent on the thickness of the insulation layer 15 it is advantageous to maintain the thickness of this layer within close tolerances. It is preferred if the insulation layer may be made from a material which can be planarized to at least 20% and preferably to 90% or better without requiring mechanical flattening. Polyimides including photosensitive polyimides such as Probyimide™ 200, 300, 400 or 10000 series from Ciba Geigy, Basel Switzerland may provide planarization better than 20% and can be spin coated. Benzocyclobutene and Acetylene terminated Polyimide both may provide planarization in excess of 90%. Benzocyclobutene, for example available under the trade name Cyclotene™ from Dow Chemical, USA, is particularly preferred as it can be spin or spray coated, has excellent insulation and planarization properties and, surprisingly, is adequately radiation resistant.

The distance between anode strip 17 and cathode plane 12, 13 is determined by the thickness of insulation layer 15 and may be between 5 and 50 microns, preferably between 10 and 25 microns. The spacing between the anode strips 17 (anode pitch) may be as little as a few tens of microns up to several hundred microns, and is typically of the order of 100 to 200 microns. The anode strips 17 need not be parallel to each other nor need they run 90° to the cathode strips 13 as the detection signals are not very sensitive to the area of cathode 13 which lies between two adjacent parts of neighboring anode strips 17. The anode strips 17 may be arranged in a radial manner, e.g. in a fan shape, and the cathode strips 13 may be in the form of concentric circles. Alternatively, the anode strips 17 may be in concentric circles and the cathode strips 13 in a radial pattern.

The anode strips 17 are made of conductive material. To obtain the necessary conductivity, it is advisable that the anode material is a metal, for instance Aluminum, Copper or Gold. Gold is particularly preferred as it is highly resistant to the products of electron avalanches and hence, is insensitive to aging. Intermediate metal layers, for instance, Titanium, may be used between the anode strip 17 and insulation layer 15, or between cathode strips 13 and substrate 11 in order to improve the adhesion of the abode and cathode metals respectively to the underlying insulation. The insulation layer 15 should not be substantially wider than the anode strips 17 within the regions of anode strips 17 which are used for detection purposes. It is particularly preferred in accordance with the present invention if the width of the anode strips 17 and the insulation layers 15 are the same, or at least the same to within +0.5 micron.

The ends of the anode strips 17 may be enlarged to provide a bonding pad 16 for connection to the external electronic circuitry. It is preferred if the ends 16 are smoothly rounded as it has been found from experiment that such large diameter and radiused ends 16 reduce unwanted breakdown. The probable mechanism of these breakdowns is the supposition of voltage signals caused by reflections at the end of the anode strips 17. It is further advantageous if the insulation layer 15 is broadened at the position of the ends 16 to form insulation layers 14 as shown schematically in FIG. 3C.

Located substantially parallel to the substrate 11 and spaced from the anode strips 17 by a distance of a few millimeters (~3 mm), is a drift electrode 19. The space 18 between the anode strips 17 and the drift electrode 19 may be filled with an ionizing gas called the target gas. Suitable ionizing gases may be Argon/Ethane or Argon/Methane mixtures such as a 90/10 mixture of Argon/Methane known as P-10 gas, pure Dimethylether (DME) or any mixture of DME (70 to 80%) and $CF_4$ or $CO_2$ to increase the drift velocity, mixtures of DME and light noble gases such as Helium or Neon, e.g. 70–80% Ne, 30–20% DME, mixtures of DME and the heavy noble gases such as Xenon or Argon, e.g. 50–70% Ar, 50–30% DME, Argon/Isobutane/Freon/methane mixtures such as 70/23/3/4 Ar/Isobutane/Freon/Dimothoxie Methane or similar gases. The pressure of the target gas may be any suitable pressure, and may vary between 0.1 Bar to 6 Bars although it is preferred if the pressure is close to atmospheric pressure for terrestrial use.

The drift electrode 19 is held at a large negative voltage, typically of the order of −2000 Volts. Where the drift electrode 19 forms the window for entrance of electromagnetic radiation into sensor 10, the drift electrode 19 may be made from a photocathode material having the property that it emits electrons when photons are incident upon it. Drift electrode 19 suitable for receiving X-ray or γ-radiation may be made of a thin layer of a material having a low atomic number such as Beryllium with a thickness of 0.5 to 2 mm, and coated with a layer of material having a high atomic number such as Gold with a thickness of 10 to 50 nm. Photocathodes sensitive to ultra-violet, visible and infrared light may be coated with such materials as Yttrium, Cesium, Cesium Iodide, Antimony, Sodium or combinations thereof or combinations of other rare earth elements. Drift electrode 19 may also include Chromium, Titanium, Tungsten, or Tantalum and may be protected by a layer of Boron, Boron Carbide or Carbon to prevent damage thereto.

Means, which are well known, are provided (not shown) for applying the respective voltages to the cathodes, the drift cathodes and the anodes. Such means are capable of providing a first electric potential between a cathode and a strip anode and a second electric potential between a cathodic drift electrode and the strip anode, and are well-known in the art.

The complete sensor 10, 20 may be placed in a gastight box (not shown) having suitable electrical connections.

When an ionizing energy bundle enters sensor 10, 20 it will ionize the molecules of the gas. This process creates ion/electron pairs of which the amount is proportional to the energy loss of the energy bundle in the sensor 10, 20. In accordance with the present invention the ionization may be caused by collisions between gas molecules or atoms and the entering particle or due to photoelectric ionization when a gas molecule or atom absorbs a photon and ejects one or more electrons. The ionizing energy bundle may be any elementary particle such as an electron, pion, muon, positron, proton, photon etc. and may be matter or antimatter. Further the particles may be charged particles or molecules with sufficient energy to create ionization. The sensor 10, 20 may also be used for non-ionizing radiation or particles when the window through which the radiation or particles enter the sensor 10, 20 is made of a material such that electrons are released from the material into the sensor 10, 20 when the radiation or particle strikes the window. Thus, non-ionizing photons may be detected by using a window which is made from a photocathode material.

The effect of the ionization is to produce negative electrons and positive ions. Under the influence of the drift field, the electrons will move towards an anode strip 17 and the ions towards the drift electrode 19 or cathode 12, 13 depending on which is closer. In the neighborhood of an anode strip 17, the field strength becomes very large and the electrons are accelerated. This produces new ionizations together with the creation of a large mount of secondary electrons. These secondary electrons are accelerated and create new ionizations resulting in avalanche formation and gas multiplication. Preferably, the voltage on the anode strips 17 and cathode plane 12, 13 should be chosen in order to obtain a proportional mode, i.e. the signal coming from the sensor 10, 20 and going to preamplifiers of electronic sensing equipment (not shown) is proportional with the energy loss of the particle in the sensor 10, 20 but the invention is not limited thereto.

As a consequence of this avalanche formation, a cloud of electrons and ions is created around one of the anode strips 17. Thanks to their large mobility the electrons rapidly reach the anode strip 17 while the ions take much longer to reach a neighboring cathode 12, 13 or drift electrode 19. Calculations show that the signal induced by the electrons is only a few percent of the total signal and it can be assumed that the major contribution to the signal amplitude comes from the induction of the ions. Accordingly, it is the drift time of the ions which determines essentially the duration of the signal.

In sensor 20 in accordance with the second embodiment, an avalanche is typically distributed over two or three cathode and anode strips 13, 17. Using an analogue readout of the strips 13, 17 the center of gravity of an avalanche can be calculated and the position of the incoming particle in the direction perpendicular to the strips 13, 17 can be determined with a resolution of about 30 microns. Alternatively, Time Domain Reflectometry (TDR) may be used for the measurement of the avalanche position. The direct avalanche signal, which reaches the preamplifier from a distance x along an anode strip 17 is compared with the avalanche signal that reaches the preamplifier after reflection on the strip end and propagated subsequently over a distance of (L−x)+L, where L is the strip length. Auto-correlation of the total signal provides the delay between direct and reflected signal. From this delay and using the propagation speed of the signal in the strip, the avalanche position can be calculated. Due to the very short time required for the development of the signal from the sensor 10, 20 in accordance with the present invention (less than 10 ms, typically 0.1 nanoseconds), the spatial resolution of the TDR measurement for the position measurement along the strips 13, 17 is increased.

Due to the high detection rates of about $10^7$ particles/mm$^2$ the microgap sensor (MGS) of the present invention is very suited for x-ray imaging applications. Compared to the photo sensitive plates presently used for X-ray imaging, the MGS has a much better contrast sensitivity thanks to an electronic read-out. It "sees" more gray values there where the photosensitive plate only provides us with a black or white image. This makes the microgap sensor interesting for example for mammography, where contrast differences of about 1% can be distinguished.

A preferred method of making the sensor 20 in accordance with the present invention will be described with reference to FIGS. 4 A, B, and C. A glass substrate 21 of about 300 micron thickness, for instance glass of type DESAG 263 from Schott, Mainz, Germany is cleansed in a mixture of Sulfuric acid and Hydrogen Peroxide and subsequently dried.

Next a cathode strip 24 is formed. A Titanium layer 22 having a thickness of a few tens of microns, typically 30 µm, is sputtered onto the glass surface followed by a layer 23 of Gold or Aluminum of at least 0.5 µm thickness. Optionally, a further Titanium layer (not shown) may be deposited onto the Au or Al layer 23. The layers 22, 23 may be patterned to form cathode strips 24 which may have a direction inclined at an angle to the subsequent applied anode strips. The layers 22, 23 may be patterned by deposition of a positive photoresist, imaging the resist layer through a mask, removing the imaged parts of the resist layer with solvent and etching the Al or Au layer 23 and Ti layer 22 using a wet etch process.

A layer 25 of polymer in the range of 5 to 50 microns thick and typically 10 microns thick is then spun-coated onto the Au or Al layer or layers 23. The polymer may be Polyimide, e.g. Probyimide from Ciba-Geigy, Basel Switzerland. It is particularly preferred if layer 25 is BCB, e.g. from Dow Chemical, USA. This step is followed by deposition of another layer 27 of conductive material, for example Al or Au. Optionally, a Ti layer may be deposited before the Al or Au layer 27. A positive resist 29 is deposited onto the surface of the conductive layer 27 and illuminated with UV light through a mask having the pattern of the subsequent anode strips 28. The illuminated parts of the resist layer 29 are removed with solvent and the Al, Au, Au/Ti or Al/Ti layer 27 is wet etched to form anode strips 28.

The anode strips 28 are used as a mask for the anisotropic etching of the polymer layer 25. This is a so-called Òself-alignment technique. The polymer layer 25 not protected by the anode strips 28 can be removed by way of a dry etching technique, e.g. RIE (Reactive Ion Etching), in order to form the insulation strips 26 coextensive over their active length with the anode strips 28. An alternative method for etching the polymer layer 25 is Scanning Laser Ablation (SLA). The non-protected polymer is removed by means of a wide scanning laser beam from a TEA-CO$_2$ laser or an excimer laser. This is again a so called Òself-alignment technique, in SLA technology also known as conformal masking. If the etching process is carried out correctly the polymer insulation strips 26 should be co-extensive with the anode strips 28, in particular the width of the polymer strips 26 should be within ±0.5 micron of the anode strips 28 in the detection area.

Subsequently, connections are made to the anode and cathode strips 24, 28 for connection to the electronic circuits by means of bonding pads 14. The cathode and anode structure is fitted into a housing, a drift electrode is mounted and the housing sealed and filled with the target gas. The methods of fitting a cathode and anode structure into a housing, and mounting a drift electrode, are well-known in the relevant field of technology.

The sensor 10, 20 in accordance with the present invention may be used as a particle counter, a scintillation counter, an X-ray imager or camera for medical applications and for the analysis of synchotron radiation in astrophysics.

Although the specific embodiments have been described with respect to particular applications, modifications and changes of the illustrated embodiments lie within the scope of the invention. Any limitations to the scope of this invention is not intended by the illustrated embodiments and/or specific configurations, materials, geometries, etc. described above, and the invention is only to be limited by the scope of the appended claims.

What is claimed is:

1. A microgap sensor comprising:
   a cathode;
   at least one strip anode parallel to said cathode, said strip anode being separated and insulated from said cathode by an insulation layer, wherein said insulation layer is made from a polymeric material; and
   a cathodic drift electrode substantially parallel to said cathode, said cathode and said drift electrode being separated by a gap fillable with an ionizable gas, said gap being considerably greater than the thickness of said insulating layer, said strip anode being located in the gap between said cathode and said drift electrode.

2. The sensor according to claim 1, wherein said polymeric material is planarizable to 20% or greater.

3. The sensor according to claim 2, wherein said polymeric material is planarizable to 90% or greater.

4. The sensor according to claim 1, wherein said polymeric material has a dielectric constant less than 5.

5. The sensor according to claim 1, wherein said polymeric material is selected from the group consisting of benzocyclobutene, polyphenylquinoxaline, fluoropolymers and polyimides.

6. The sensor according to claim 5, wherein said polyimide is selected from the group consisting of fluorinated polyimide, silicone polyimide, acetylene terminated polyimide, and polyimide iso-indoloquinazdinedione.

7. The sensor according to claim 5, wherein said fluoropolymer is PTFE.

8. The sensor according to claim 1, wherein said polymeric material is either a polyimide or a benzocyclobutene.

9. The sensor according to claim 1, comprising a plurality of said strip anodes.

10. The sensor according to claim 9, wherein said plurality of strip anodes are arranged parallel to each other.

11. The sensor according to claim 9, wherein said plurality of strip anodes are arranged in a radial pattern.

12. The sensor according to claim 9, wherein said plurality of strip anodes are arranged in a plurality of circles with differing diameters.

13. The sensor according to claim 9, wherein said cathode comprises a plurality of strip cathodes insulated from each other.

14. The sensor according to claim 12, wherein said polymeric material is planarizable to 20% or greater.

15. The sensor according to claim 13, wherein said polymeric material is planarizable to 90% or greater.

16. The sensor according to claim 13, wherein said polymeric material has a dielectric constant less than 5.

17. The sensor according to claim 13, wherein said polymeric material is selected from the group consisting of benzocyclobutene, polyphenylquinoxaline, fluoropolymers and polyimides.

18. The sensor according to claim 17, wherein said polyimide is selected from the group consisting of fluorinated polyimide, silicone polyimide, acetylene terminated polyimide, and polyimide iso-indoloquinazdinedione.

19. The sensor according to claim 17, wherein said fluoropolymer is PTFE.

20. The sensor according to claim 13, wherein said polymeric material is either a benzocyclobutene or a polyimide.

21. The sensor according to claim 13, wherein within a detection region of said sensor the widths of said insulation layers are substantially the same as the widths of said plurality of said strip anodes.

22. The sensor according to claim 1, wherein at least one of said cathodic drift electrodes or said cathode is composed of a material of low atomic number which forms a window for the entrance of electromagnetic radiation into the sensor, and a layer of a material of high atomic number which emits electrons when photons are incident upon it, said layer of high atomic number being in contact with said layer of low atomic number.

23. The sensor according to claim 22, wherein said material of low atomic number is selected from the group consisting of beryllium, aluminum, quartz, glass and plastic, and wherein said high atomic number material is selected from the group consisting of gold, cesium, yttrium, cesium iodide, chromium, tantalum and tungsten.

24. The sensor according to claim 1, further comprising means for applying a first electric potential between said cathode and said strip anode and a second potential between said cathodic drift electrode and said strip anode.

25. The sensor according to claim 1, wherein within a detection region of said sensor the width of said insulation layer is substantially the same as the width of said strip anode.

26. An X-ray imager including the sensor as recited in claim 1.

27. An X-ray camera including the sensor as recited in claim 1.

28. A 2-dimensional X-ray imager including the sensor as recited in claim 1.

29. A method of manufacture of a microgap sensor, comprising the steps of:
   forming a first conductive cathode layer;
   depositing a polymeric insulating layer onto said first conductive cathode layer;
   depositing a second conductive layer onto said polymeric insulating layer;
   carrying out a first etch on said second conductive layer to form a plurality of anode strip electrodes;
   removing the polymeric insulating layer except underneath said plurality of anode strip electrodes; and
   mounting a cathodic drift electrode substantially parallel to said first conductive cathode layer, said first conductive cathode layer and said cathodic drift electrode being separated by a gap, said gap being considerably greater than the thickness of said insulating layer and said plurality of anode strip electrodes lying between said first conductive cathode layer and said cathodic drift electrode.

30. The method of manufacture according to claim 29, wherein the first etching step is carried out by wet etching.

31. The method of manufacturing according to claim 29, wherein said removal of said polymeric insulation step is carried out by a second anisotropic etch.

32. The method of manufacture according to claim 31, wherein said anisotropic etch is carried out by either Reactive Ion Etching or Scanning Laser Ablation.

33. The method of manufacture according to claim 29, wherein said polymeric insulation layer comprises material selected from the group consisting of benzocyclobutene, polyphenylquinoxaline, fluoropolymers and polyimides.

34. The method of manufacture according to claim 33, wherein said polyimide is selected from the group consisting of fluorinated polyimide, silicone polyimide, acetylene terminated polyimide, and polyimide isoindoloquinazdinedione.

35. The method of manufacture according to claim 33, wherein said fluoropolymer is PTFE.

36. The method of manufacture according to claim 29, wherein the material for said insulating layer comprises either a benzocyclobutene or a polyimide.

* * * * *

UNITED STATES PATENT AND TRADEMARK OFFICE
CERTIFICATE OF CORRECTION

PATENT NO. : 5,731,584
DATED : March 24, 1998
INVENTOR(S) : Eric Beyne, et al.

It is certified that error appears in the above-identified patent and that said Letters Patent is hereby corrected as shown below:

Column 5, line 35 after "layer" insert --15--

Column 6, line 4 delete --abode-- insert --anode--

Column 6, line 10 delete --+0.5-- insert --±0.5--

Column 8, line 1 delete --ms-- insert --ns--

Signed and Sealed this

Tenth Day of October, 2000

Attest:

Q. TODD DICKINSON

Attesting Officer

Director of Patents and Trademarks